United States Patent [19]
Greyzck

[11] Patent Number: 5,987,626
[45] Date of Patent: Nov. 16, 1999

[54] PRECISE DETECTION OF ERRORS USING HARDWARE WATCHPOINT MECHANISM

[75] Inventor: Terry D. Greyzck, Eagan, Minn.

[73] Assignee: Cray Research, Inc., Eagan, Minn.

[21] Appl. No.: 08/920,177

[22] Filed: Aug. 25, 1997

[51] Int. Cl.$^6$ .................................................. G06F 11/00
[52] U.S. Cl. .................... 714/38; 714/37; 714/48
[58] Field of Search ........................ 395/183.1, 183.14, 395/183.13, 183.11, 183.21, 185.01, 185.05, 185.02, 185.03, 185.04, 185.06, 183.07, 183.06, 183.09; 371/40.3, 67.1; 364/788

[56] References Cited

U.S. PATENT DOCUMENTS

| | | | |
|---|---|---|---|
| 5,257,358 | 10/1993 | Cohen ..................................... | 395/575 |
| 5,355,469 | 10/1994 | Sparks et al. ........................... | 395/575 |
| 5,371,747 | 12/1994 | Brooks et al. .......................... | 371/19 |
| 5,493,649 | 2/1996 | Slivka et al. ....................... | 395/185.01 |
| 5,590,354 | 12/1996 | Klapproth et al. ...................... | 395/800 |
| 5,659,679 | 8/1997 | Alpert et al. .......................... | 395/183.1 |
| 5,673,386 | 9/1997 | Batra .................................. | 395/183.14 |
| 5,684,944 | 11/1997 | Lubbers et al. ..................... | 395/182.04 |
| 5,740,413 | 4/1998 | Alpert et al. ............................ | 395/568 |
| 5,751,942 | 5/1998 | Christensen et al. .............. | 395/183.14 |

*Primary Examiner*—Ly V. Hua
*Attorney, Agent, or Firm*—Schwegman, Lundberg, Woessner & Kluth PA

[57] ABSTRACT

The precise detection of errors in computer programs using the hardware watchpoint mechanism found in computers is disclosed. In one embodiment, a software detection phase of a method detects the approximate location of an error, generating information regarding this approximate location. In this embodiment, a hardware watchpoint phase of the method detects the precise location of the error based on the information generated by the software detection phase, generating information regarding the precise location. Finally, in this embodiment of the invention, a debugger phase of the method identifies the statement in the computer program causing the error, based on the information generated by the hardware watchpoint phase.

19 Claims, 5 Drawing Sheets

| STATEMENT | INSTRUCTION | SOFTWARE DETECTION NOTES |
|---|---|---|
| INT TABLE[1000];<br>...<br>LOCK_TABLE(TABLE)<br>UNLOCK_ELEM(TABLE, 17); | a<br>b | START SOFTWARE DETECTION PHASE<br>CALCULATE CHECKSUM<br>CHECKSUM VERIFIED |
| TABLE[17]=5;<br>LOCK_ELEM(TABLE); | c | CALCULATE CHECKSUM |
| TABLE[15]=3;<br>...<br>UNLOCK_ELEM(TABLE, 5); | x<br>d | CHECKSUM VERIFICATION FAILS |

FIG. 4(a)

PRECISE DETECTION OF ERRORS USING HARDWARE WATCHPOINT MECHANISM

FIELD OF THE INVENTION

This invention relates generally to the detection of errors in programs executed by computers, and more particularly to precise detection of such errors using the hardware watchpoint mechanism of the computers.

BACKGROUND OF THE INVENTION

The increasing complexity and length of computer programs makes their debugging an arduous process. A computer program may have literally billions of lines of code, any one of which may be responsible for causing an error in the program. When encountering such an error, the computer programmer may be forced to step through the program line by line in order to find the statement in the program causing the error. This manual process results in delays in developing computer programs in a timely fashion, and wastes resources that are better used in writing programs, not debugging them.

An example of an error that may be very difficult to precisely locate is the wild store. A wild store is an error which results when a write instruction of a computer program writes to a table in memory at an improper time or point in the computer program (for example, when the table is locked), or when the write instruction oversteps the boundaries of the table to which it intended to or is permitted to write, and instead writes to a different table in memory. The statement in a computer program causing a wild store is difficult to detect because, in the case where the statement is writing to a table in memory at an improper time, there may be millions of statements that must be manually examined to find the offending statement.

Furthermore, in the case where the statement is overstepping the boundaries of the table to which it is permitted to write, the difficulty in precisely detecting the statement is compounded by the nature of pointers that may be causing such errors. For example, in the C programming language, an array of integers may be defined as int x[50], which gives the array fifty elements 0 . . . 49, and a pointer may be defined as int *p. If at some point in the computer program p==x+50, not necessarily as a result of the statement p=x+50, but as a result of p being incremented in some fashion, p will no longer point within the array x, and the statement *p=5, for example, will result in the storing of the integer 5 outside of the range of the array x (since x+50==&x[50], while x is defined only through x[49]). Thus, in a program of billions of statements, tracking down the statement *p=5 as the statement causing a wild store error outside the boundaries of the array x is difficult and unintuitive.

In the context of supercomputers, proposed solutions for detecting such errors do not in actuality precisely detect the errors. For example, the Cray C90 and Cray T90 supercomputers, available from the Cray Research subsidiary of Silicon Graphics, Inc., headquartered in Eagan, Minn., include a hardware watchpoint mechanism that generates an interrupt when any address within a defined contiguous range of addresses within the memory has been accessed. However, the hardware watchpoint mechanism is itself limited in that it is able to only watch one contiguous range of memory for an entire program, while a given computer program typically defines thousands of tables spanning many different discontiguous ranges of memory. Furthermore, once the hardware watchpoint mechanism is enabled, it generates an interrupt when an address within its defined memory range is accessed regardless of whether the access is proper or improper. Thus, the mechanism cannot be simply enabled and expected to catch a wild store error.

There is a need, therefore, to solve these problems related to the precise detection of errors in computer programs, such as wild store errors. Such a solution should identify the precise statement in a computer program causing a wild store error both in the case where the statement is occurring at an improper time (i.e., the relevant table is locked), and in the case where the statement is overstepping the boundaries of the relevant table (i.e., as may result when using dynamic pointers). Furthermore, the solution should specifically be able to detect precisely an error regardless of the one of different discontiguous ranges of memory to which the error particularly relates, and thus should implicitly be able to distinguish between proper and improper accesses to these tables.

SUMMARY OF THE INVENTION

The above-mentioned shortcomings, disadvantages and problems are addressed by the present invention, which will be understood by reading and studying the following specification. The invention relates to the precise detection of errors in computer programs using the hardware watchpoint mechanism found in computers. In one embodiment of the invention, a method first detects a range of instructions within a computer program in which the error is occurring by utilizing a software detection scheme (such as calculating and verifying a checksum value), and then detects the precise point within the range of instructions at which the error is occurring by utilizing the hardware watchpoint mechanism of the computer. The method may also identify the exact statement in the computer program corresponding to the precise point within the range of instructions at which the error is occurring by utilizing a debugging tool.

The invention overcomes the deficiencies found in the prior art. When detecting the range of instructions within a computer program in which an error such as a wild store is occurring, the invention desirably determines the particular table (i.e., to which a particular range of memory relates) to which the wild store is writing. Furthermore, by detecting the range of instructions within a computer program in which an error such as a wild store is occurring, the invention implicitly distinguishes between proper and improper accesses to these tables, regardless of the nature of the improper access (such as proper a statement occurring at an improper time, or a statement overstepping the boundaries of a relevant table).

The invention, by detecting the range of instructions within a computer program in which an error such as a wild store is occurring, detects the approximate location of the error. The invention is then able to use the hardware watchpoint mechanism of the computer to detect precisely the location of the error within the range of instructions. In other words, the invention overcomes the limitations of the hardware watchpoint mechanism by using the mechanism only when it is appropriate, to specifically hone in on the error once the approximate location of the error within the computer program is known.

The utilization of a first software detection phase to detect approximately the location of an error such as a wild store within a computer program and a second hardware watchpoint phase to detect precisely the location of the error is believed to be an advance in the detection of errors within computer programs. The present invention describes methods, systems, and computer-readable media of varying scope. In addition to the aspects and advantages of the present invention described here, further aspects and advantages of the invention will become apparent by reference to the drawings and by reading the detailed description that follows.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into six sections. In the first section, a computerized system according to an exemplary embodiment of the invention is described. In the second section, a general method according to an exemplary embodiment of the invention is presented. In the third section, specific embodiments of the software detection phase, hardware watchpoint phase, and debugger phase of the general method are provided. In the fourth section, represent operation of the specific embodiments described in the third section is described in relation to a rudimentary computer program. In the fifth section, exemplary output of an embodiment of the invention in relation to a computer program in which an error has been precisely detected is presented. Finally, in the sixth section, a conclusion of the detailed description is described.

An Exemplary Computerized System

Figure 1:
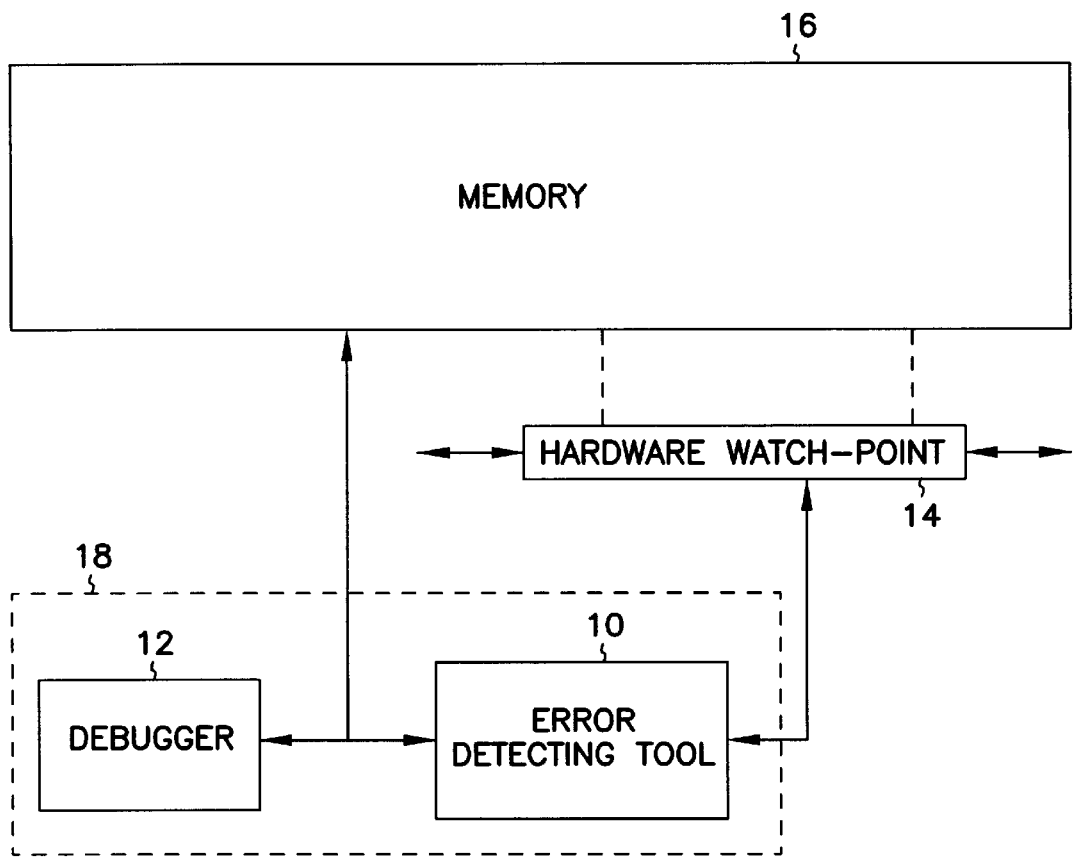
FIG. 1 shows a diagram of a computerized system according to an exemplary embodiment of the invention.

Referring to FIG. 1, a diagram of a computerized system according to an exemplary embodiment of the invention is shown. The description of FIG. 1 is intended to provide a brief, general description of suitable computer hardware and a suitable computing environment in conjunction with which the invention may be implemented. Those of ordinary skill within the art will recognize, however, that not all components of a typical computerized system are described. Only those components with particular relevance and relation to the present invention are shown in and described in conjunction with FIG. 1. Although not required, the invention itself is described in the general context of computer-executable instructions, being executed by a computer, such as a supercomputer.

The computerized system of FIG. 1 includes error detecting tool 10 operatively coupled to debugger 12, hardware watchpoint mechanism 14, and memory 16, where hardware watchpoint mechanism 14 and debugger 12 are also operatively coupled to memory 16. Dotted-line box 18 surrounding error detecting tool 10 and debugger 12 indicates that both tool 10 and debugger 12 may reside as software on the same computer-readable medium, the software executable on the computerized system of FIG. 1. The computer-readable media may be a hard disk drive (HDD), a floppy disk insertable into a floppy disk drive (FDD), a memory such as a dynamic random-access memory (DRAM) a read-only memory (ROM), or any other type of computer-readable media; the invention is not so limited. Thus, debugger 12 and tool 10 may be implemented as software, although they also may be implemented as hardware as well. Conversely, hardware watchpoint 14 is implemented in hardware.

A computer program and its associate data space resides within memory 16, such that error detecting tool 10 is able to precisely locate any errors within the computer program causing improper access within the memory by utilizing hardware watchpoint mechanism 14. Such errors include wild stores, which may result from instructions that are improperly writing to the memory. Those of ordinary skill within the art will appreciate that memory 16 is comprised of a series of addressable memory locations (i.e., addresses), and memory 16 may be physical memory, virtual memory, or any other type of memory. Those of ordinary skill within the art will also appreciate that the computer program is typically comprised of a series of instructions known as object code such that a point or location within the program refers to a particular instruction within the program. Furthermore, the series of instructions results from the compiling of a series of subroutines known as source code, each subroutine including a plurality of statements, with a compiler. The writing of a computer program in source code permits faster and easier development of the program, while the compiling of the source code into object code permits the computer to execute the program.

Hardware watchpoint mechanism 14 generates an interrupt when any address within a defined contiguous range of addresses within memory 16 has been accessed. Computerized systems that include such hardware watchpoint mechanisms include the Cray C90 and T90 supercomputers previously described in the background of the invention. Thus, while error detecting tool 10 initially determines a range of instructions within the computer program in which the error occurs, it subsequently utilizes hardware watchpoint mechanism 14 to locate the precise point within this range of instructions at which the error occurs. Debugger 12, commonly included with computerized systems such as the Cray C90 and T90 supercomputers, then is desirably used to trace back the error to a particular statement in the source code of the computer program based on information received from error detecting tool 10 (such as the particular location/instruction at which the error occurred).

A description of a computerized system according to an exemplary embodiment of the invention has been provided.

The exemplary system includes a hardware watchpoint mechanism, an error detecting tool, a debugger, and a memory in which a computer program resides. The error detecting tool utilizes the hardware watchpoint mechanism to precisely locate any errors within the computer program, and then desirably utilizes the debugger to track back the locations of these errors to particular statements within the computer program.

Exemplary General Method

Figure 2:
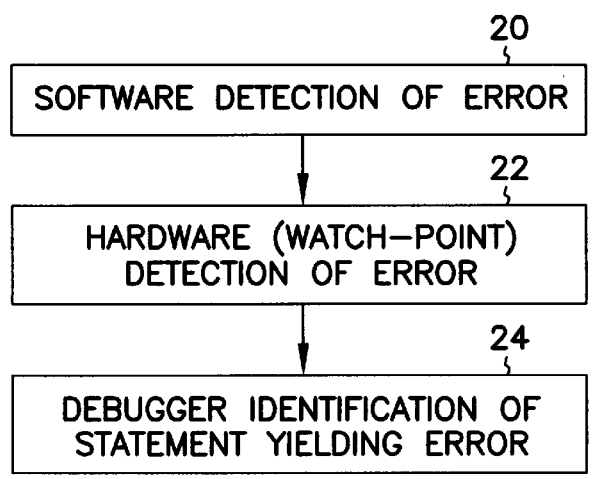
FIG. 2 shows a flowchart of a general method according to an exemplary embodiment of the invention.

Referring to FIG. 2, a flowchart of a general method according to an exemplary embodiment of the invention is shown. The flowchart of FIG. 2 is a computerized method that desirably is performed by the computerized system of FIG. 1. Those of ordinary skill within the art will appreciate that the flowchart of FIG. 2 may be implemented in such a computerized system by a series of executable instructions as part of a computer program, although the invention is not necessarily so limited.

An initial software detection phase is represented by step 20. The software detection phase may, for example, be executed as a part of error detecting tool 10 of FIG. 1. In step 20, the approximate location of an error within a computer program is detected, and information regarding this approximate location is generated. This information in one embodiment is the range of instructions within the computer program in which the error occurs. For example, the beginning and/or ending addresses of the range may be generated, where the addresses refer to locations within a memory such as memory 16 of FIG. 1.

The invention is not limited to the manner in which the software detection phase determines the approximate location of the error; any software detection scheme may be utilized. In one embodiment, the software detection scheme includes calculating and verifying a checksum value, the checksum generated according to methods known within the art such as XOR'ing the values in a table, etc. In supercomputers such as the Cray C90 and T90, a table may not be written to unless it is first unlocked, and after it is written to, it should be locked. By calculating a checksum value every time a table is locked, and then verifying that the value has not changed the next time the table is unlocked, when an error causing a wild store within the table exists, the range of instructions within the computer program in which the error occurs is easily determined. This range is the series of instructions from when the table was locked until the next time the table was unlocked and at which time the checksum value did not match the checksum value generated when the table was previously locked.

A hardware watchpoint phase is represented by step 22. The hardware watchpoint phase may, for example, be executed by hardware watchpoint mechanism 14 of FIG. 1, as controlled by error detecting tool 10 of FIG. 1. In step 22, the precise location of the error within a computer program is detected based on information generated by the software detection phase, and information regarding this precise location is generated. The information generated in step 22 in one embodiment is the specific instruction within the computer program at which the error occurs. For example, the specific address of this instruction may be generated, where the address refers to a location within a memory such as memory 16 of FIG. 1. This information may be signaled as an interrupt generated by the hardware watchpoint mechanism, as those of ordinary skill within the art will appreciate.

Thus, the software detection phase in one embodiment passes the range of instructions in which the error occurs to the hardware watchpoint phase, along with the specific range within the memory affected by the error (e.g., the particular table affected by the error). The hardware detection phase then may enable the hardware watchpoint mechanism only during the range of instructions in which the error occurs, and setting the mechanism to watch only the specific range of memory affected by the error. Thus, when the computer program is run a second time during the hardware detection phase, an interrupt will be generated by the hardware watchpoint mechanism exactly where the error is occurring.

A debugger phase is represented by step 24. The debugger phase may, for example, by executed by debugger 12 of FIG. 1, which is also known as a debugging tool, as controlled by error detecting tool of FIG. 1. In step 24, the particular statement of the computer program causing the error is identified based on the information generated by the hardware watchpoint phase (e.g., the specific address or location of the instruction of the computer program at which the error occurs). This statement thus corresponds to the precise point within the range of instructions first determined by the software detection phase at which the error occurs. The invention is not limited to a particular manner in which the debugger phase identifies the particular statement of the program causing the error. Those of ordinary skill within the art will recognize that such debugging is typically accomplished by tracing back the offending instruction in the object code of the computer program to its corresponding statement in the source code of the program.

A description of a general method according to an exemplary embodiment of the invention has been provided. The exemplary general method includes three phases: a software detection phase, a hardware watchpoint phase, and a debugger phase. The first phase determines the approximate location of the error in the computer program. The second phase, based on this approximate location, finds the precise location of the error. The third phase, based on this precise location, identifies the statement in the computer program causing the error.

Figure 3A:
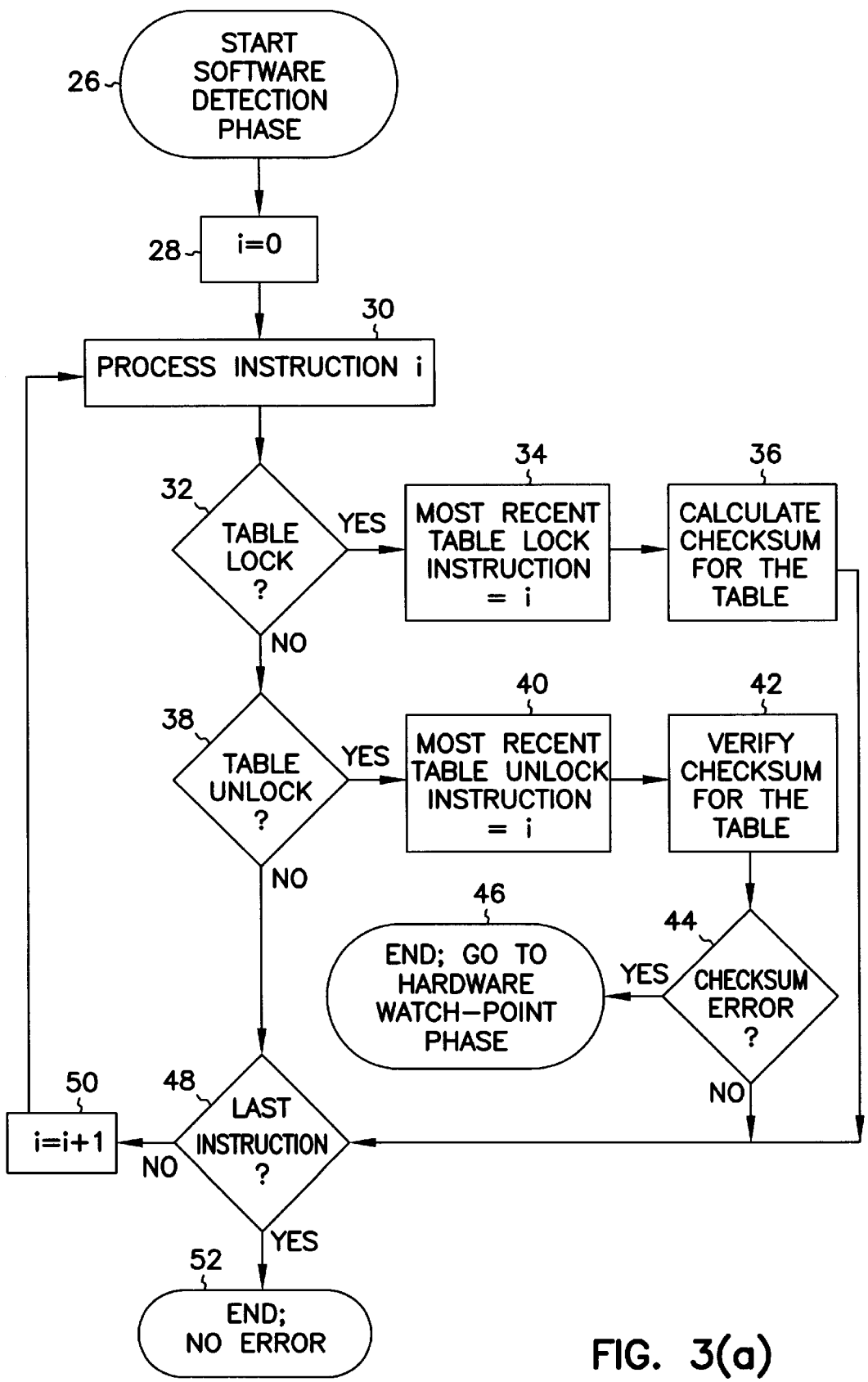
FIG. 3(a) shows a flowchart of the software detection phase of the general method of FIG. 2 according to a particular embodiment of the invention.
Figure 3B:
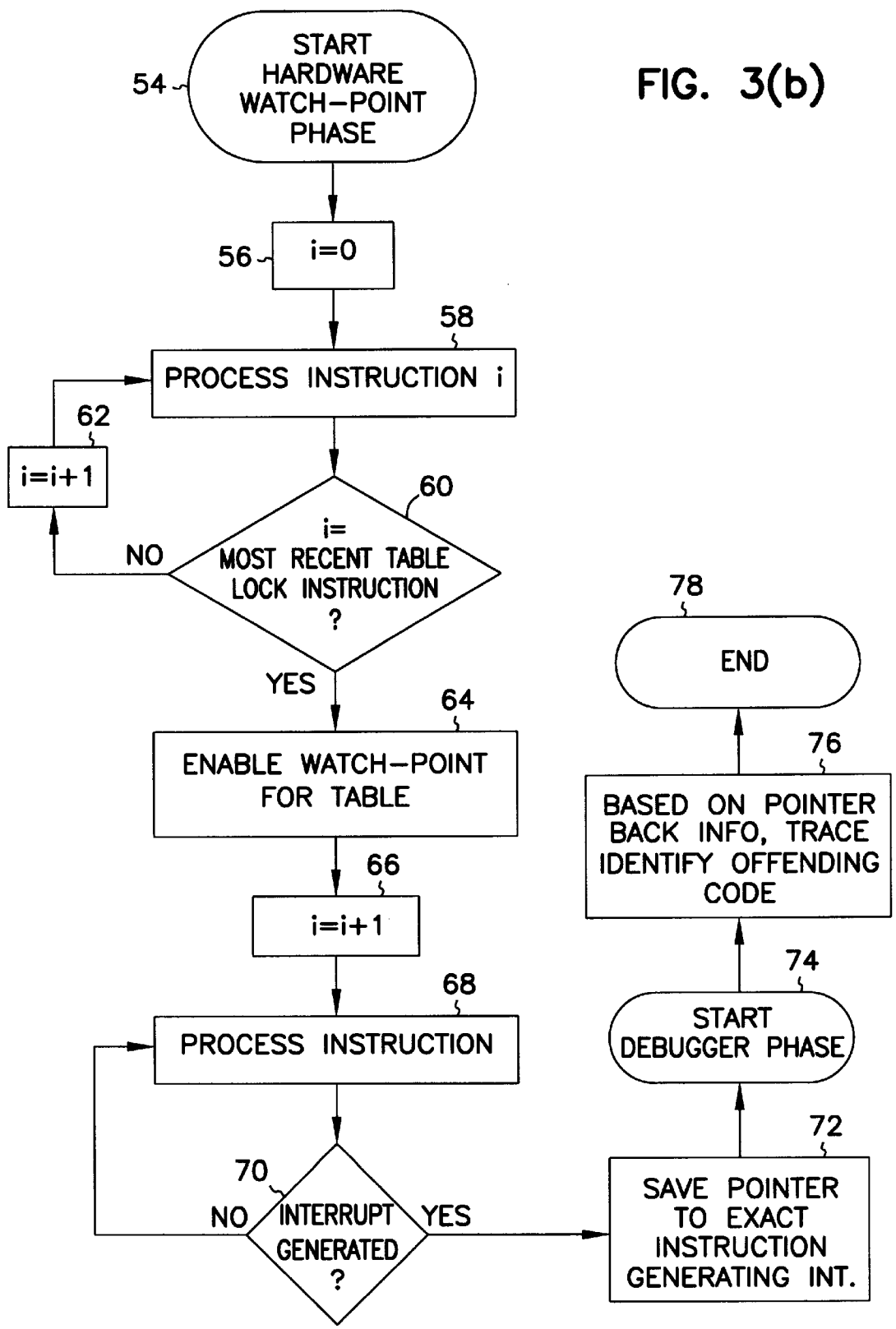
FIG. 3(b) shows a flowchart of the hardware watchpoint phase and the debugger phase of the general method of FIG. 2 according to a particular embodiment of the invention.

Specific Embodiments of the Software Detection, Hardware Watchpoint, and Debugger Phases Referring to FIG. 3(a) and FIG. 3(b), flowcharts of the software detection, hardware watchpoint, and debugger phases identified in conjunction with the description of FIG. 2, according to a specific embodiment of the invention, are shown. The flowcharts of FIG. 3(a) and FIG. 3(b) are computerized methods that desirably are performed by the computerized system of FIG. 1. Those of ordinary skill within the art will appreciate that the flowcharts of FIG. 3(a) and FIG. 3(b) may be implemented in such a computerized system by a series of executable instructions as part of a computer program, although the invention is not necessarily so limited. Furthermore, the invention is not limited to the particular embodiments of the software detection, hardware watchpoint, and debugger phases shown in and described in conjunction with FIG. 3(a) and FIG. 3(b).

The initial software detection phase starts at step 26 of FIG. 3(a). In step 28, the instruction counter i is reset to zero. Instruction counter i refers to the ith instruction of the computer program to be checked for errors such as wild stores. For example, when i=0, the counter points to the first instruction in the program, when i=1, the counter points to the second instruction in the program, et seq. In step 30, instruction i within the computer program is processed, or executed, as is typically accomplished by computerized systems.

In step 32, however, instruction i is examined to determine whether it is a table lock instruction (viz., whether a lock instruction has been proceeded to). In computer programs amenable to error detection according to the embodiments of the invention shown in FIG. 3(*a*) and FIG. 3(*b*), a table (i.e., array) of data cannot be written to unless it is first unlocked via a table unlock instruction, and prior to subsequently being written to must be relocked via a table lock instruction. Any table of data during initialization must also first be locked, so that it initially is in a locked state.

If a table lock instruction is found in step 32, in step 34, the most recent table lock instruction value for the particular table being locked is set to i, the location of the table lock instruction. Therefore, there is a most recent table lock instruction value for each table in the computer program, which enables this embodiment of the invention to track multiple tables (corresponding to discontiguous ranges of memory, such as memory 16 of FIG. 1). In step 36, a checksum for the particular table that has been locked is calculated. This checksum may be calculated in any manner, such as the XOR method, which exclusive or's all the contents of the table. For the checksum as well, there is a checksum for each table in the computer program.

If a table lock instruction is not found in step 32, in step 38 instruction i is examined to determined whether it is a table unlock instruction (viz., whether an unlock instruction has been proceeded to). If a table unlock instruction is found in step 38, in step 40, the most recent table unlock instruction value for the particular table being locked is set to i, the location of the table unlock instruction. There is a most recent table unlock instruction value for each table in the computer program, which also enables this embodiment of the invention to track multiple tables. In step 42, a checksum for the particular table that has been unlocked is calculated, and, in step 44, compared (viz., verified) with the checksum for the particular that had been previously calculated in an execution of step 36.

If verification of the checksum fails in step 44, this means that an error has occurred with respect to the particular table some time after the table has been most recently locked (the most recent table lock value set in step 34) and before the table has been unlocked (the most recent table unlock value set in step 40). Therefore, the range of instructions from the most recent table lock value to the most recent table unlock value is the approximate location of the error. This is the information generated by the software detection phase which is then passed to the hardware watchpoint phase in step 46. Other information that may also be passed on includes the table which has been affected by the error.

If, however, in step 32 and in step 38 no table lock or unlock instruction was found, or if there was no checksum verification error in step 44, or after the checksum was calculated in step 36, the method of FIG. 3(*a*) proceeds to step 48. In step 48, instruction i is examined to determine whether it is the last instruction to be executed in the computer program. If not, in step 50 the counter i is increased by one to point to the next instruction to be executed in the program, and control reverts back to step 30 (i.e., the loop repeats). If in step 48 the last instruction to be executed has been found, the method of FIG. 3(*a*) ends at step 52, signifying that no errors such as wild store errors have been detected in the computer program.

The hardware watchpoint phase starts at step 54 of FIG. 3(*b*). In step 56, the instruction counter i is again reset to zero. This signifies that once the approximate location of the error has been detected in the software detection phase, the computer program is run through again to determine the precise location of the error. In step 58, instruction i within the computer program is processed, as is typically accomplished by computerized systems. In step 60, i is examined to determine whether it is equal to the most recent table lock instruction value of the table that is affected by the error, as determined in the software detection phase (viz., whether the lock instruction has been proceeded to). If not, in step 62 the counter i is increased by one to point to the next instruction to be executed in the program, and control reverts back to step 58.

Once the most recent table lock instruction value of the table that is affected by the error has been found in step 60, this signifies that the beginning of the approximate location of the error (i.e., the beginning of the range of instructions in which the error occurs) has been found. Therefore, in step 64, the hardware watchpoint mechanism is enabled to watch when the table is next written to. That is, the hardware watchpoint mechanism is enabled for the contiguous range of addresses corresponding to the table affected by the error. In step 66, the counter i is increased by one to point to the next instruction to be executed in the program, and instruction i within the program is processed in step 68. This process repeats until the hardware watchpoint mechanism generates an interrupt, which is detected in step 70.

When in step 70 an interrupt has been detected, this signifies that the instruction within the computer program causing the error has been precisely located. In other words, after a table has been locked, no write instructions regarding that table should be further processed until the table is first unlocked. Because at step 60 the most recent table lock instruction has been found, it is known that the next time the table is written to, that an improper wild store error has occurred. By enabling the hardware watchpoint mechanism in step 64 to watch for this wild store, when an interrupt has been generated and detected in step 70, it is known that the precise location of the erring instruction has been determined. In step 72, the pointer to this exact instruction (i.e., the current value of counter i) is saved.

The debugger phase starts at step 74 of FIG. 3(*b*). In step 76, the debugger identifies the statement of the computer program that corresponds to the instruction pointed to by the pointer saved in step 72. That is, the debugger utilizes this track back information to determine the statement of the computer program that caused the error (i.e., the wild store in the particular table that had already been locked). Utilizing such information to determine the corresponding statement in the program via a debugger is known within the art, and is available in such computerized systems as the Cray C90 and T90 supercomputers. The programmer thus is able to use this information to rewrite the statement of the program, so that the error does not reoccur. The method of FIG. 3(*b*) ends at step 78.

A description of the software detection, hardware watchpoint, and debugger phases according to a specific embodiment of the invention has been provided. The software detection phase determines the approximate location of the error in the computer program by determining the table lock instruction and the table unlock instruction between which the error occurs. The hardware watchpoint phase determines the precise location of the error between these two instructions by desirably setting the hardware watchpoint mechanism to look for a writing to the table affected by the error, and enabling the mechanism at the table lock instruction signifying the beginning of the range in which the error occurs. Finally, the debugger phase identifies the statement in the computer program corresponding to the instruction, the precise location of which has been identified by the hardware watchpoint phase.

Representative Operation of the Specific Embodiments

Figure 4B:
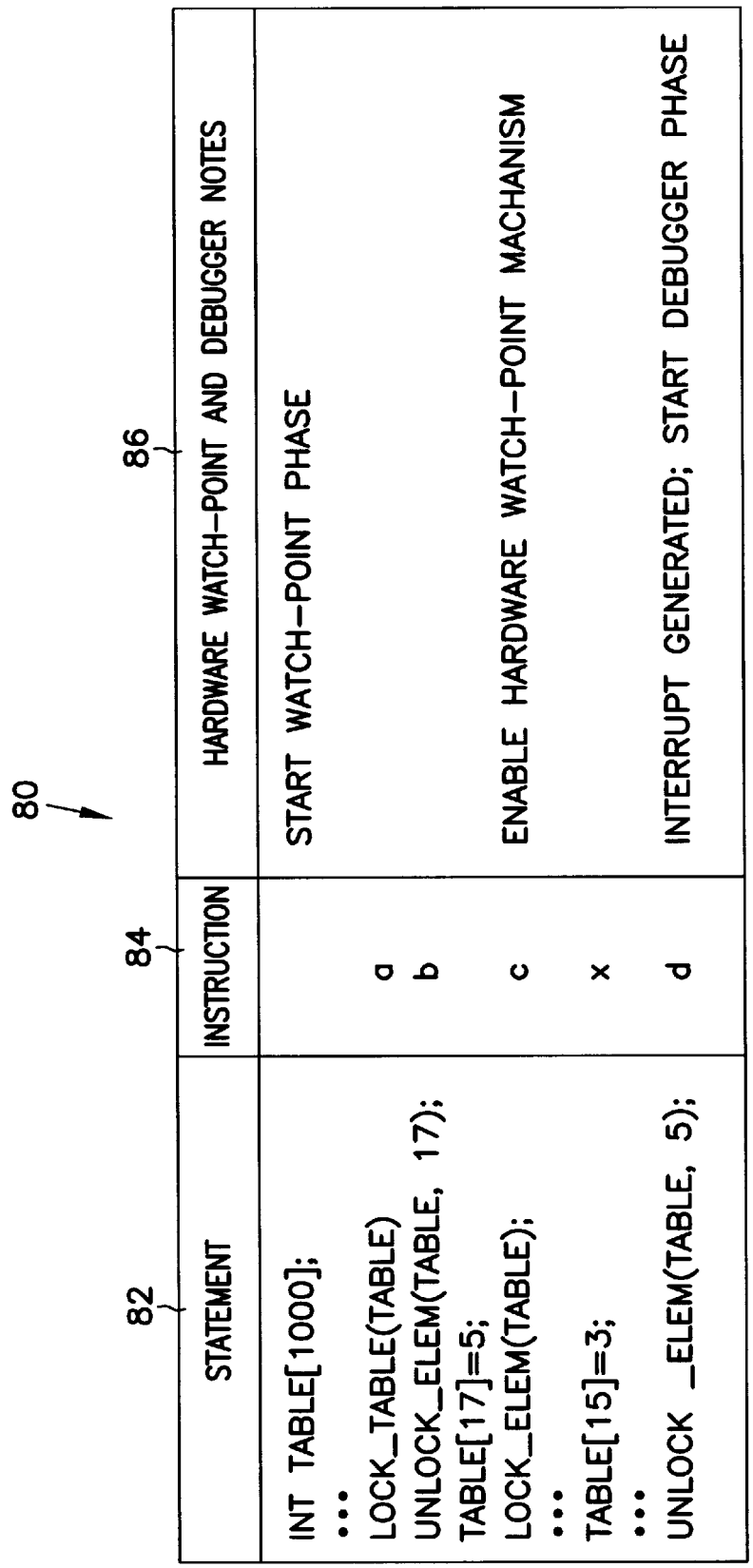
FIG. 4(a) shows a diagram of a rudimentary computer program in conjunction with which the software detection phase of a method of an embodiment of the invention has be performed; and, FIG. 4(b) shows a diagram of the rudimentary computer program of FIG. 4(a) in conjunction with which the hardware watchpoint and debugger phases of a method of an embodiment of the invention have been performed.

In this section, the representative operation of the specific embodiments of the invention shown in and described in conjunction with FIG. 3(a) and FIG. 3(b) is described. Referring to FIG. 4(a) and FIG. 4(b), a diagram of a rudimentary computer program in conjunction with which the software detection, hardware watchpoint, and debugger phases of the specific embodiments have been performed is shown. Specifically, a diagram of the rudimentary computer program with notes regarding the operation of the software detection phase as to which is shown in FIG. 4(a), and a diagram of the rudimentary program with notes regarding the operation of the hardware watchpoint and debugger phases as to which is shown in FIG. 4(b). Those of ordinary skill within the art will appreciate that only those aspects of the rudimentary program illustrative of the operation of the specific embodiments of the invention have been shown, and that furthermore the program is not designed to perform any useful purpose beyond providing explanatory value as to the specific embodiments of the invention.

The computer program 80 of FIG. 4(a) is illustrated as having three columns: a statement column 82 listing the statements within the source code of the computer program, an instruction column 84 listing representative instructions within the object code of the computer program (as represented by letters a, b, c, et seq.), and a notes column 88 listing notes regarding the operation of the software detection phase as it pertains to the computer program 80. The instructions in column 84 are representative in that the actual instructions are typically hexadecimal statements understood by the processor of the computerized system, and therefore not listed. The software detection phase of the computer program begins with the statement int table[1000], which defines an array table having one-thousand integer elements. The subsequent ellipses represents that the instructions for many statements may be executed prior to reaching the lock table instruction represented as a for the statement lock_table(table).

At instruction a for the statement lock_table(table), the software detection phase calculates a checksum for the table table. The next instruction b is an unlock table instruction, unlock_elem(table, 17), that specifically unlocks the table [17] entry for writing. At this unlock table instruction, the checksum is calculated again and compared with the checksum previously calculated at the last lock table instruction for the table table for verification purposes. The checksum is verified as correct at instruction b, since there were no intervening write instructions between the most recent time the table table was locked, and instruction b. The table[17] entry is specifically written to by the instruction x corresponding to the statement table[17]=5. When the table is locked again, at the lock table instruction c for the statement lock_element(table), the checksum for the table table is calculated again. Note that each time a table lock or table unlock instruction is reached, the most recent table lock instruction value or the most recent table unlock instruction value, respectively, is set.

The subsequent ellipses following the statement for the lock table instruction c represents that the instructions for many statements may be executed prior to reaching the instruction x for the statement table[15]=3. The instruction x for this statement is a wild store error, since it is writing to the table table impermissibly; the table has not been unlocked prior to the instruction being executed. Note that while the statement for this instruction x is easily identified manually as a wild store, the statement could have been a statement such as *pointer=3, where pointer=&table[15], which would have been very difficult to identify manually as a wild store. The subsequent ellipses following the statement for the wild store instruction x represents again that the instructions for many statements may be executed prior to reaching the unlock table instruction d for the statement unlock_elem(table, 5).

When the unlock table instruction d is processed, the software detection phase calculates the checksum for the table table and compares it with the checksum previously calculated at instruction c. However, because there was an intervening wild store, the verification fails, and the software detection phase approximately locates the wild store error as occurring between instruction c and instruction d. Note that because there may exist many instructions for statements between instructions c and d, it is still difficult to specifically identify the offending instruction as the instruction x for the statement table[15]=3.

Because an error has been detected by the software detection phase, the hardware watchpoint phase and the debugger phase are next executed on the computer program, as is shown by reference to FIG. 4(b). The computer program 80 of FIG. 4(b) has the same statement column 82 and instruction column 84 as has been described in conjunction with FIG. 4(a), but instead of notes column 88, as shown in FIG. 4(b) it has notes column 86 listing notes regarding the operation of the hardware watchpoint and debugger phases as they pertain to the computer program 80. The hardware watchpoint phase of the computer program begins again with the statement int table[1000], and the subsequent ellipses represents that the instructions for many statements may be executed prior to reaching the lock table instruction represented as a for the statement lock_table (table).

In the hardware watchpoint phase, the instructions for the statements lock_table(table), unlock_elem(table, 17), and table[17]=5 are first processed in order. When the lock table instruction c for the statement lock_elem(table) is processed, however, the hardware watchpoint mechanism is enabled for the table table, because the hardware watchpoint phase knows that the wild store error has been previously approximately located by the software detection phase in a range starting at instruction c. The subsequent ellipses following the statement for the lock table instruction c represents that the instructions for many statements may be executed prior to reaching the instruction x for the statement table[15]=3. None of these unlisted statements writes to the table table, and therefore the hardware watchpoint mechanism does not generate an interrupt as a result of the instruction for any of these statements being processed.

However, because the instruction x for the statement table[15]=3 causes a value to be written to the table table, the processing of the instruction x for this statement causes the hardware watchpoint mechanism to generate an interrupt. The hardware watchpoint phase detects this interrupt, and thus detects the precise location at which the wild store error occurred, at the instruction x for the statement table[15]=3. the debugger phase then begins, identifying that the instruction x corresponds to the statement table[15]=3. The debugger can then pass this information to the programmer writing the computer program 80, to permit the programmer to easily rewrite or eliminate the statement table[15]=3, or otherwise prevent the wild store error from occurring again.

A description of the representative operation of the specific embodiments of the invention shown in and described in conjunction with FIG. 3(a) and FIG. 3(b) has been described. The description has been provided in conjunction with a rudimentary computer program having a statement causing a wild store error to occur. Although the computer program does not perform a useful function, it has explanatory value in showing the operation of specific embodiments of the invention.

Exemplary Output from an Embodiment of the Invention

In this section, exemplary output from an embodiment of the invention is provided. This output is representative output of what a programmer may see when running an embodiment of the invention on a computer program having an error such as a wild store.

The representative output of the software detection phase of the embodiment of the invention is:

```
***
***        ERROR - Compiler table checksum error
***
***        Checksum error information:
           Marked at checksum sequence 8567 in table 'Symbol_info'
           The error is between the following addresses:
               012021775
               012034735
```

Note that only a checksum sequence and a range of addresses in which an error has occurred are identified. This range of addresses corresponds to a range of memory in the computer program being examined. The checksum sequence is the important information in this embodiment of the invention, however, and is all that is necessary to pass to the hardware watchpoint phase for the hardware watchpoint phase to specifically locate the error.

The representative output of the hardware watchpoint phase is fed directly into the debugger phase, which provides the following representative output according to this embodiment of the invention:

which the error has occurred. Note further that the routine that calls the routine _handlr is the routine causing the error. Therefore, in this representative output, the routine p_mem_error_01, at instruction address 06201207d, is the routine that has caused the error which has been precisely detected. This routine is thus the statement causing the error. The failing instruction location (06201207d) was found by the hardware watchpoint mechanism.

Exemplary output from an embodiment of the invention has been provided. This exemplary output is representative of what a programmer may see when running an embodiment of the invention. The software detection phase provides output regarding the range of addresses in which the error has occurred. The hardware watchpoint phase provides output regarding the specific address at which the error has occurred. Finally, the debugger phase provides output regarding the specific routine causing the error.

Conclusion

The precise detection of errors in computer programs using the hardware watchpoint mechanism found in computers has been described. A computerized system according to an exemplary embodiment of the invention, and which includes an error detecting tool, a debugger tool, and a hardware watchpoint mechanism, has been described. A general method according to an exemplary embodiment, and having a software detection phase, a hardware watchpoint phase, and a debugger phase, has also been described. Specific embodiments of each of the phases of the general method have been provided. Finally, the operation of the specific embodiments in relation to a rudimentary computer program, as well as exemplary output of an embodiment of the invention, has been presented.

Although specific embodiments have been illustrated and described herein, it will be appreciated by those of ordinary skill in the art that any arrangement which is calculated to achieve the same purpose may be substituted for the specific embodiments shown. For example, a method according to the invention may not require all three phases as has been described. Furthermore, a method according to the invention

```
Data incorrectly written to:
Table : Symbol_info
Count : 28 Space : 700 Start : 012021777
LB 1 ES 64 MS 8388607 FLAGS 04
Traceback initiated at "wsig_proc"+060d (P = 06203740a, line 2093)
"wsig_proc" called by "_handlr" (P = 07526565c) with 1 argument
    1) 0000000000000000000043 ->(167514000172610016751O = '_L_H')
"_handlr" called by "p_mem_error_01" (P = 06201207d) with 0 arguments
"p_mem_error_01" called by "p_mem_create_error" (P = 06201244a, line 793) with 0 arguments
"p_mem_create_error" called by "pdgcs_opt_vac" (P = 06224614a, line 610) with 1 argument
    1) 0000000000000000000001 ->(0060000104000000000000 ='_@_')
"pdgcs_opt_vec" called by "pdgcs_main" (P = 06224550c, line 583) with 0 arguments
"pdgcs_main" called by "PDGCD_do_proc" (P = 04756623d, line 2537) with 0 arguments
"PDGCS_do_proc" called by "cvrt_proc_to_pdg" (P = 03227244b, line 1214) with 0 argument
"cvrt_proc_to_pdg" called by "cvrt_to_pdg" (P = 03226054a, line 1004) with 1 argument
    1) 00000000000000011020134 ->(04654134442006215420061 = 'Mar .26 1')
"cvrt_proc_to_pdg" called by "main" (P = 0132651d, line 308) with 1 argument
    1) 00000000000000011020134 ->(04654134442006215420061 = 'Mar 26 1')
"main" called by "$START$" (P = 07453321d, line 332) with 3 arguments
    1) 00000000000000000000006 ->(0)
    2) 00000000000000011426060 ->(00000000000000011426211 = 2501769)
    3) 00000000000000011426067 ->(00000000000000011426231 = 2501785)
```

Note that a specific address at which the error has occurred is identified. This specific address corresponds to the precise instruction in the computer program being examined at is not limited to the specific embodiments of the phases as has been described. This application is rather intended to cover any adaptations or variations of the present invention.

Therefore, it is manifestly intended that this invention be limited only by the following claims and equivalents thereof.

I claim:

1. A method for detecting an error in a computer program executed on a computer having a hardware watchpoint mechanism comprising:

detecting a range of memory locations in which the error occurs;

enabling the hardware watchpoint mechanism to monitor the range of memory locations; and detecting a precise point within the range of memory locations at which the error occurs by utilizing the hardware watchpoint mechanism of the computer to generate an interrupt corresponding to the precise point when the hardware watchpoint mechanism detects a memory access.

2. The method of claim 1, further comprising identifying a statement of the computer program corresponding to the precise point within the range of memory locations at which the error occurs.

3. The method of claim 1, wherein detecting a range of memory locations in which the error occurs comprises calculating and verifying a checksum value.

4. The method of claim 1, wherein the error comprises a wild store.

5. A method for detecting an error within a computer program executed on a computer having a hardware watchpoint mechanism comprising:

executing a software detection phase to detect approximately the location of the error, the software detection phase generating information regarding approximately the location of the error; and, executing a hardware watchpoint phase to detect precisely the location of the error based on the information generated by the software detection phase, the hardware watchpoint phase generating information regarding precisely the location of the error.

6. The method of claim 5, further comprising executing a debugging phase to identify a statement of the computer program causing the error based on the information generated by the hardware watchpoint phase.

7. The method of claim 5, wherein the information generated by the software detection phase comprises a location of a lock instruction within the computer program, the lock instruction preceding an unlock instruction within the computer program at which verification of a checksum value failed.

8. The method of claim 5, wherein the information generated by the hardware watchpoint phase comprises an interrupt at the location of an instruction within the computer program causing the error.

9. The method of claim 5, wherein the software detection phrase comprises:

(a) proceeding to a lock instruction within the computer program pertaining to a table;

(b) calculating a checksum value for the table;

(c) proceeding to an unlock instruction within the computer program pertaining to the table;

(d) verifying the checksum value for the table; and, (e) repeating (a)–(d) until verification in (d) fails.

10. The method of claim 9, wherein the hardware watchpoint phase comprises:

(f) proceeding to the lock instruction within the computer program pertaining to the table, verification of the checksum for which failed in (d)

(g) enabling the hardware watchpoint mechanism of the computer to generate an interrupt when the table has been written to by an instruction; and, (h) processing the instructions of the computer program proceeding the lock instruction until the interrupt has been generated by the hardware watchpoint mechanism.

11. A computerized system comprising:

a memory;

a hardware watchpoint mechanism to generate an interrupt when any address within a defined contiguous range of addresses within the memory has been accessed; and, an error detecting tool to precisely locate an error within a computer program causing improper access of an address within the memory, by utilizing the hardware watchpoint mechanism, wherein the error detecting tool initially determines a range of memory locations within the computer program in which the error occurs, and utilizes the hardware watchpoint mechanism to locate a precise point within the range of memory locations at which the error occurs.

12. The computerized system of claim 11, further comprising a debugger operatively coupled to the error detecting tool to trace back the error to a statement in the computer program based on information received from the error detecting tool.

13. The computerized system of claim 12, wherein the error detecting tool utilizes the debugger to determine the statement in the computer program that caused the error after having precisely located the error.

14. The computerized system of claim 12, wherein the information comprises a precise location of the error.

15. The computerized system of claim 11, wherein the error comprises a wild store.

16. The computerized system of claim 11, wherein the improper access comprises an improper write.

17. A computer-readable medium having computer-executable instructions to cause a computer having a hardware watchpoint mechanism to perform a method comprising:

(a) proceeding to a lock instruction within a computer program pertaining to a table;

(b) calculating a checksum value for the table;

(c) proceeding to an unlock instruction within the computer program pertaining to the table;

(d) verifying the checksum value for the table;

(e) repeating (a)–(d) until verification in (d) fails;

(f) proceeding to the lock instruction within the computer program pertaining to the table, verification of the checksum for which failed in (d);

(g) enabling the hardware watchpoint mechanism of the computer to generate an interrupt when the table has been written to by an instruction; and, (h) processing the instructions of the computer program proceeding the lock instruction until the interrupt has been generated by the hardware watchpoint mechanism.

18. The computer-readable medium of claim 17, wherein the method further comprises (i) identifying a statement of the computer program corresponding to the instruction that has written to the table in (g).

19. A method for detecting an error in a computer program, comprising:

detecting a range of memory locations in which an error occurs;

setting a hardware watchpoint mechanism to detect a memory access within the range of memory locations;

detecting the memory access via the hardware watchpoint mechanism; and tracing the memory access to an instruction in the computer program.

* * * * *